Feb. 25, 1941.   R. G. ROBINSON   2,233,032
NOVELTY
Filed Feb. 6, 1940   2 Sheets-Sheet 1

Inventor
Richard G. Robinson

Feb. 25, 1941.   R. G. ROBINSON   2,233,032
NOVELTY
Filed Feb. 6, 1940   2 Sheets-Sheet 2
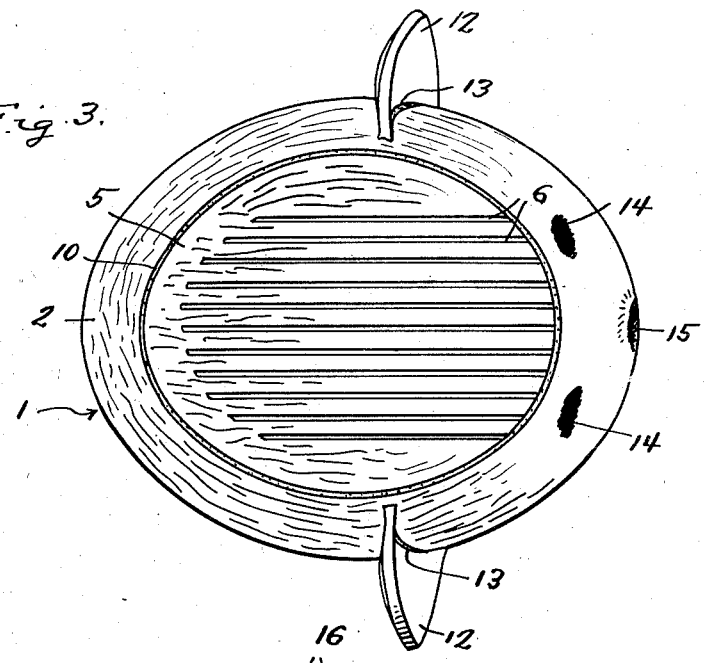
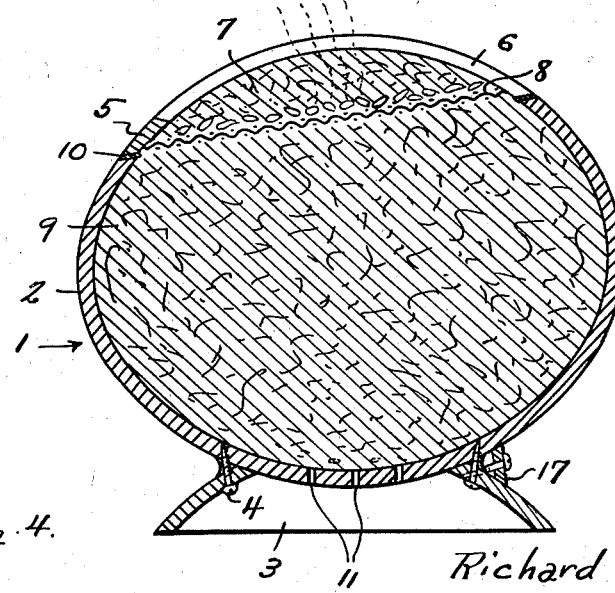
Inventor
Richard G. Robinson
By Clarence A. O'Brien
and Hyman Berman
Attorneys Patented Feb. 25, 1941

2,233,032

UNITED STATES PATENT OFFICE 2,233,032

NOVELTY

Richard George Robinson, Miami, Fla.

Application February 6, 1940, Serial No. 317,597

1 Claim. (Cl. 47—34)

The present invention relates to new and useful improvements in novelties and has for its primary object to provide, in a manner as hereinafter set forth, an article of this character formed principally from coconut shells and having a unique, amusing appearance.

Another very important object of the invention is to provide a novelty in the form of a figure head comprising a construction and arrangement for growing grass, said grass representing hair on the head.

Other objects of the invention are to provide a novelty of the aforementioned character which will be comparatively simple in construction, durable and which may be produced at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a top plan view.

Figure 4 is a view in vertical longitudinal section through the device.

Figure 1:
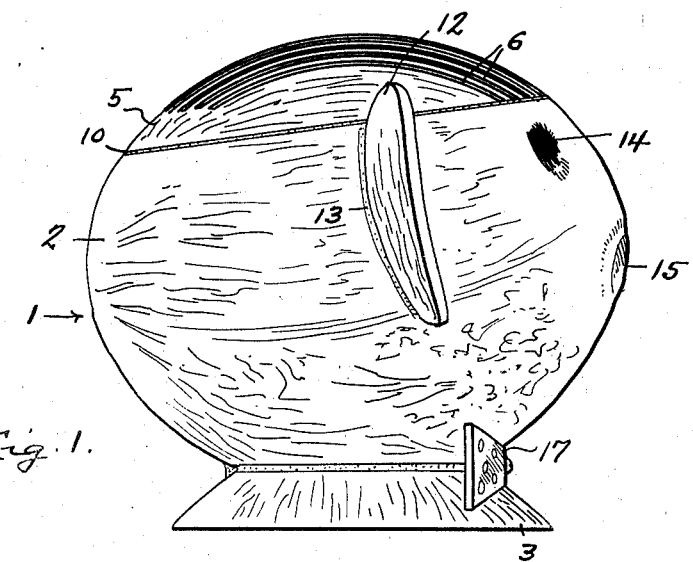
Figure 1 is a view in side elevation of a device constructed in accordance with the present invention.
Figure 2:
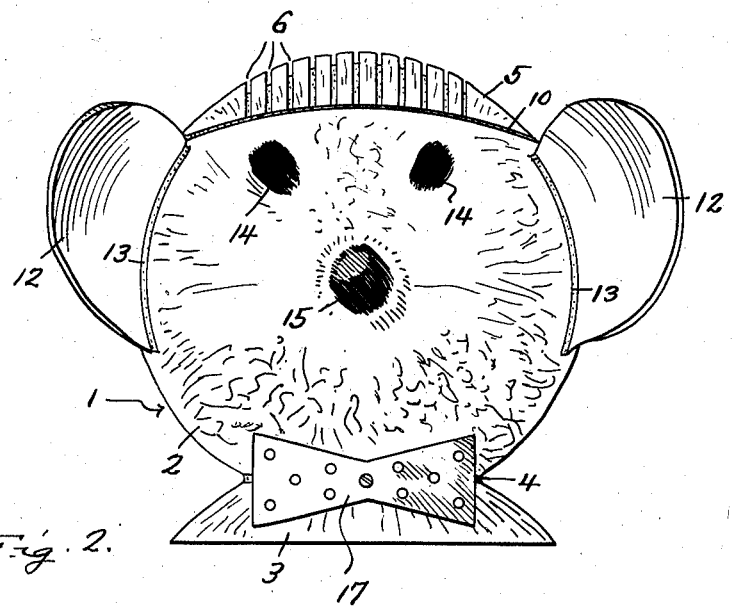
Figure 2 is a view in front elevation thereof.

Referring now to the drawings in detail, it will be seen that the embodiment of the invention which has been illustrated comprises a head which is designated generally by the reference numeral 1, said head being formed from the shell of a coconut from which the meat has been removed. This shell is designated by the reference numeral 2. The shell 2 is mounted on a base 3 and firmly secured thereto, as at 4, said base being formed from a portion or section of a coconut shell.

An upper section 5 of the shell 2 is cut off and a plurality of spaced, parallel slots 6 are sawed thereinto from its front end to a point adjacent its rear end. This section 5 may be said to represent the skull of the head 1.

The skull section 5, when removed, is inverted and substantially filled with peat moss and rye grass seed, as at 7. Then, a wire screen 8 is secured in the section 5 for retaining the peat moss and rye grass seed 7 therein. The shell 2 is then filled with peat moss 9 after which the section 5 is replaced and firmly secured with a suitable waterproof adhesive, as at 10. The lower portion of the shell 2 is provided with a plurality of drain holes 11.

Elements 12 representing ears are firmly secured, as at 13, on the side portions of the shell 2. The ears 12 are also formed from portions of coconut shell. The usual three holes in one end portion of the shell 2 are then painted in a manner to represent eyes 14 and a nose 15. The front, or face of the head 1 may then be painted any desired color, also the fronts of the ears 12. Mounted on the front of the device, between the head 2 and the base 3, is a member 17, also of coconut shell, which is shaped and painted to represent a dotted bow tie.

With the article thus completed it is turned up-side-down and the slotted top portion thereof is submerged in water which, of course, enters through the slots 6. This performance is repeated periodically and in due course the seeds 7 will sprout and the grass will grow through the slots 6, as at 16, said grass representing hair on the head 1.

It is believed that the many advantages of a novelty constructed in accordance with the present invention will be readily understood and although a preferred embodiment of the article is as illustrated and described, it is to be understood that changes in the details of construction and in the combination and arrangement of parts may be resorted to which will fall within the scope of the invention as claimed.

What is claimed is:

A novelty comprising a coconut shell representing a head, said shell including an adhesively secured upper portion representing the skull of the head, said upper portion having a plurality of spaced, parallel slots extending longitudinally therein from its forward edge to a point in spaced relation to its rear edge, a foraminous element in said upper portion defining a chamber, grass seed in the chamber adapted to sprout through the slots, and a water absorbing element in the shell below the foraminous member.

RICHARD GEORGE ROBINSON.